(12) United States Patent
Baracca et al.

(10) Patent No.: US 11,867,233 B2
(45) Date of Patent: Jan. 9, 2024

(54) SUPPORT ASSEMBLY FOR FOOD APPLICATIONS HAVING AN IMPROVED REAR SEALING DEVICE

(71) Applicant: AKTIEBOLAGET SKF, Gothenburg (SE)

(72) Inventors: Fausto Baracca, Massa (IT); Andrea A. Bertolini, Carrara (IT); Fabio Falaschi, Carrara (IT)

(73) Assignee: AKTIEBOLAGET SKF

( * ) Notice: Subject to any disclaimer, the term of this patent is extended or adjusted under 35 U.S.C. 154(b) by 3 days.

(21) Appl. No.: 17/712,333

(22) Filed: Apr. 4, 2022

(65) Prior Publication Data

US 2022/0325755 A1 Oct. 13, 2022

(30) Foreign Application Priority Data

Apr. 12, 2021 (IT) .................. 102021000009026

(51) Int. Cl.
*F16C 19/06* (2006.01)
*F16C 23/08* (2006.01)
(Continued)

(52) U.S. Cl.
CPC ............ *F16C 33/723* (2013.01); *F16C 19/06* (2013.01); *F16C 23/084* (2013.01);
(Continued)

(58) Field of Classification Search
CPC ...... F16C 19/06; F16C 23/084; F16C 33/723; F16C 33/7823; F16C 33/7826;
(Continued)

(56) References Cited

U.S. PATENT DOCUMENTS 5,328,276 A * 7/1994 Linteau .................. F16C 33/76
384/477
7,419,305 B2 * 9/2008 Nisley ..................... F16C 33/76
384/477
(Continued)

FOREIGN PATENT DOCUMENTS

DE 2839584 3/1980
EP 1065394 1/2001
(Continued)

OTHER PUBLICATIONS

Search Report for corresponding Italian Patent Application No. 102021000009026 dated Dec. 1, 2021.

*Primary Examiner* — Phillip A Johnson
(74) *Attorney, Agent, or Firm* — Reed Smith LLP

(57) ABSTRACT

Support assembly for movable, rotating or sliding shafts, having a bearing unit adapted to receive the movable shaft, a casing and a cover for fluid sealing an opening of an internal seat of the casing; the bearing unit having a radially outer ring, a radially inner ring and a row of rolling elements between the radially outer ring and the radially inner ring; the support assembly also being provided with: a rear sealing device, placed on the opposite side with respect to the cover, and comprising a metal shield and a vulcanized rubber liner equipped with a first, axially outer, sealing lip and with a second, axially inner, sealing lip the support assembly being characterized in that the rear sealing device comprises a further third sealing lip slidingly contacting the radially inner ring.

15 Claims, 3 Drawing Sheets

(51) Int. Cl.
  *F16C 33/78* (2006.01)
  *F16C 33/80* (2006.01)
  *F16C 33/72* (2006.01)

(52) U.S. Cl.
  CPC .......... *F16C 33/7823* (2013.01); *F16C 33/80* (2013.01); *F16C 33/805* (2013.01)

(58) Field of Classification Search
  CPC F16C 33/783; F16C 33/7853; F16C 33/7876; F16C 33/7886; F16C 33/805; F16C 35/042; F16C 35/045; F16C 43/045; F16J 15/3232; F16J 15/3236; F16J 15/3248; F16J 15/3252
  See application file for complete search history.

(56) References Cited

U.S. PATENT DOCUMENTS

2003/0127803 A1* 7/2003 Yokoyama .......... F16C 33/7816
  277/549
2015/0267753 A1* 9/2015 Ciulla .................... B60B 7/066
  384/489
2018/0100546 A1 4/2018 Ress

FOREIGN PATENT DOCUMENTS

| JP | 2003161372 A | * | 6/2003 | |
|---|---|---|---|---|
| JP | 2007132428 A | * | 5/2007 | .......... F16C 33/7853 |
| WO | 2003074888 | | 9/2003 | |

\* cited by examiner

SUPPORT ASSEMBLY FOR FOOD APPLICATIONS HAVING AN IMPROVED REAR SEALING DEVICE

CROSS REFERENCE TO RELATED APPLICATIONS

This application is based on and claims priority to Italian Patent Application No. 102021000009026 filed on Apr. 12, 2021, under 35 U.S.C. § 119, the disclosure of which is incorporated by reference herein.

FIELD

This disclosure relates to a support assembly for food applications, having an improved rear sealing device.

PRIOR ART

A support assembly is generally fixed to a machine frame and is intended to support movable shafts, for example rotating shafts, by means of a suitable bearing unit.

BRIEF DESCRIPTION OF THE DRAWINGS

The invention will now be described with reference to the attached drawing, which shows a non-limiting example of its embodiment, in which.

DETAILED DESCRIPTION

Figure 1:
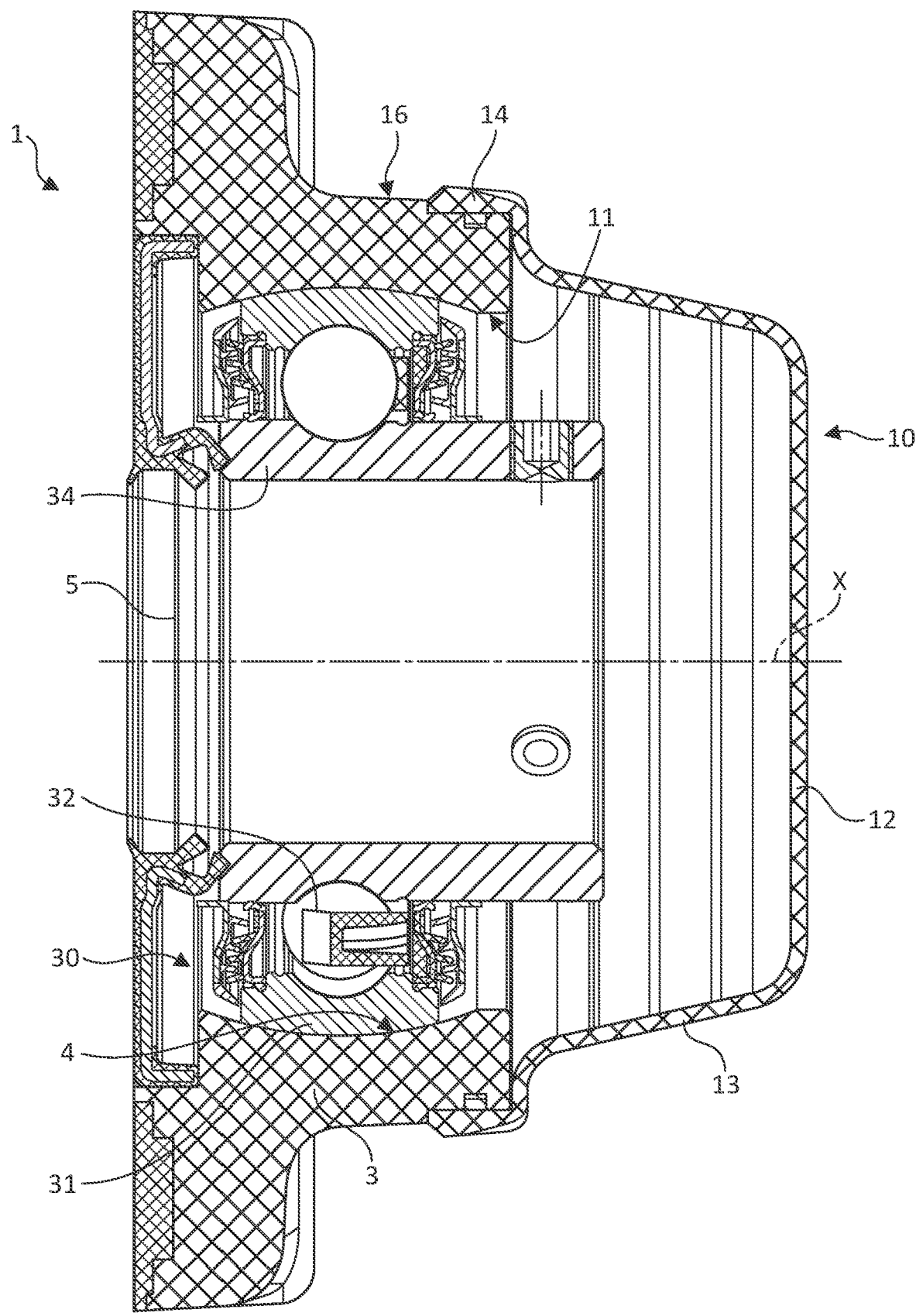
FIG. 1 shows a cross section through the support assembly according to an embodiment of the present invention.
Figure 2:
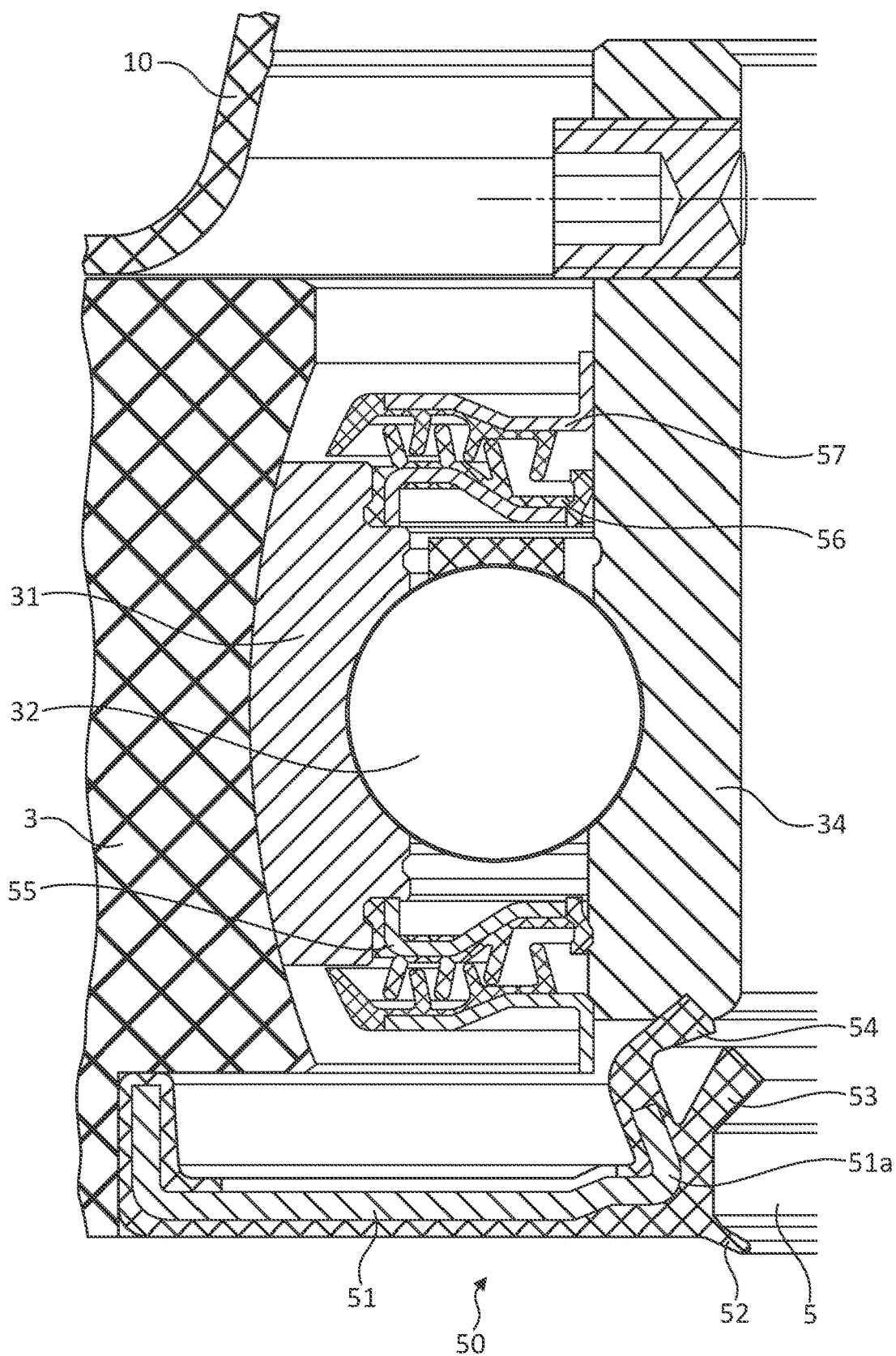
FIG. 2 shows a detail of FIG. 1 on an enlarged scale.

In the food industry (also known as "food and beverages", or simply "F&B") there is an increasing interest in the development of new machines and machine designs intended to improve the safety and quality of foods. Machines used in the food industry have numerous moving parts supported by rotating or slidable shafts, such as conveyor belts, mixers, and machines for washing fresh foods.

All these machines have to be cleaned frequently, usually with water to which detergents and/or disinfectants have been added, in order to control any development of bacterial colonies that might contaminate the foods. In particular, these machines may not have gaps or other parts where dirt, or even the washing water, can penetrate and stagnate. This is because the stagnation of liquids or moisture favours a possible proliferation of bacteria.

Support assemblies for movable shafts may be of a terminal type, housing a terminal end of the shaft, or of a through type. These support assemblies may be formed by a casing, which may be an annular casing, having a base or flange for fixing a bearing unit to a machine, the base or flange located inside the casing and coupled to a movable shaft, and a cover, which may be cup-shaped, that is coupled by a force fit to the casing in such a way that a coupling portion of the cover forms a fluid seal with a radially outer lateral surface of the casing. On a side opposite to the cover, a rear sealing device may also be provided, the sealing device including a metal shield onto which a vulcanized rubber element equipped with a plurality of sealing lips may be co-moulded.

In addition to a front seal between a cover and a casing and a rear sealing device, further sealing devices that may include a metal shield, onto which a vulcanized rubber element equipped with a plurality of sealing lips may be co-moulded, are provided to protect a bearing unit. In particular, one or more sealing devices may be positioned on an axially outer side and on an axially inner side of a row of rolling bodies. The axially outer sealing device may be formed by a pair of shields in which corresponding sealing lips face each other. The axially inner sealing device may include a single shield onto which a vulcanized rubber element with sealing lips is co-moulded.

In particular, in order to obtain certification for the IPx9k test, a support assembly may withstand high-pressure jets of hot water. Through tests conducted on known solutions have revealed that a rear part of the support assembly, opposite the cover, of known solutions do not withstand the conditions set by the test specifications. In other words, the lips of the axially inner seal do not ensure sealing for the water conditions specified below:
  pressure: 80/100 bar
  jet: 10/15 cm
  temperature: 80° C.
  flow rate: 14/16l/min
  time: 2 mins.

Most of the water enters a rear part of an assembly through the lips of a rear sealing device. In particular, a high-pressure water jet enters an interior of a support assembly because it lifts the lips of a rear sealing device under these conditions. More particularly, because of the high-pressure water jet, an axially outer lip of known solutions is lifted, in part because the interference is less than that of the axially inner lip. Thus we have identified that a problem of the axially inner lip, because of its shape and the flexibility of the rubber used in known solutions, it can easily be lifted by water under these conditions. This problem is further aggravated by the fact that such bearing units have a less effective sealing device in their axially inner parts. Consequently, water entering through a rear sealing device of a support assembly also enters an interior of a bearing unit, where it reaches the lubricant and the retaining cage. A device suffering such defects may not pass the certification test.

It is therefore necessary to define a support assembly that offers a novel design solution that is capable of resolving, or at least mitigating, the aforementioned drawbacks.

A novel inner sealing system improves sealing performance in the presence of water and detergents at high pressure and temperature.

Purely by way of non-limiting example and with reference to the aforesaid figures, the number 1 indicates the whole of a support assembly for movable, rotating or slidable shafts which, for the sake of simplicity, are not illustrated.

A support assembly 1 comprises a bearing unit 30, for example a rolling bearing unit of a known type, which in turn comprises a radially outer ring 31, a radially inner ring 34, and a row of rolling elements 32, such as balls, interposed between said rings. A bearing unit 30 is capable of receiving, in a known way, a movable shaft 5, such as a rotating shaft, in order to support it. A support assembly 1 further comprises a casing 3 within which the bearing unit 30 is housed in a stable and known way.

A support assembly 1 is, in particular, intended to be mounted on machines for the food industry. For this purpose, a casing 3 is of the type intended to be mounted in a fixed way on the frame of a known machine, particularly for the food industry, which for the sake of simplicity is not illustrated. A casing 3 has an annular overall shape, and is designed so as to be able to receive the bearing unit 30 in a known way within itself, particularly in the through seat 4. The seat 4 has an overall axis of symmetry X which is also the axis of symmetry of the casing 3.

A support assembly 1 also comprises a cover 10 for fluid sealing an opening 11 of a through seat 4 of the casing 3.

A cover 10 for a casing 3 is bowl-shaped overall and comprises a bottom wall 12, an annular lateral wall 13 extending transversely relative to the bottom wall 12, and a coupling portion 14 towards the casing 3.

A coupling portion 14 is annular and is designed to be coupled, in use, to a casing 3, laterally on the outside of said casing. In particular, it is shaped as a socket joint and is coupled radially and laterally on to the outside of a radially outer lateral surface 16 of a casing 3.

A lateral surface 16 and a coupling portion 14 are defined by solids of revolution, and have a common axis of symmetry, which, in the illustrated examples, coincides with an axis of symmetry X (FIG. 1) of the cover 10, and which is also the axis of symmetry of the casing 3 and of the through seat 4.

Throughout the present description and the claims, terms and expressions indicating positions and orientations such as "radial" and "axial" are to be interpreted as relative to the central axis of rotation X of the bearing unit 30. On the other hand, expressions such as "axially outer" and "axially inner" relate to the assembled condition of the support assembly, and in the present case preferably relate to a cover side and to a side opposite the cover side, respectively.

In addition to the fluid seal formed between the cover 10 and the casing 3, the support assembly 1 is also provided with an innovative rear sealing device 50, placed on the opposite side to that of the cover 10, and comprising a metal shield 51 on which is co-moulded a vulcanized rubber liner equipped with a plurality of sealing lips, the shape and functions of which are explained more fully below.

Additionally, inside the support assembly 1, there are further sealing devices, each of which also comprises a metal shield on to which is co-moulded a vulcanized rubber element equipped with a plurality of sealing lips, for the purpose of protecting the bearing unit 30. In particular, the sealing devices are positioned both on the axially outer side and on the axially inner side of the row of rolling bodies 32. The axially inner sealing device comprises a single shield 55, on to which is co-moulded a vulcanized rubber liner having a plurality of sealing lips. The shield 55 is interference mounted on to the radially outer ring 31 of the bearing unit 30, and is in sliding contact with the radially inner ring 34.

On the other hand, the axially outer sealing device comprises a first shield 56, on to which is co-moulded a vulcanized rubber liner having a plurality of sealing lips, and a second shield 57, on to which is also co-moulded a vulcanized rubber lining having a plurality of sealing lips. The shield 56 is interference mounted on to the radially outer ring 31 of the bearing unit 30, and is in sliding contact with the radially inner ring 34, while the shield 57 is interference mounted on to the radially inner ring 34 without being in sliding contact with the radially outer ring 31. The corresponding pluralities of lips of the first shield 56 and the second shield 57 face each other to form a kind of labyrinth seal, or "gutter seal", on the axially outer side of the bearing unit 30.

According to one aspect of the present invention, in order to improve the fluid sealing performance of the support assembly 1 on its axially inner side, that is to say on the opposite side to the cover 10, a rear sealing device 50 is provided, this rear sealing device comprising a shaped metal shield 51 on to which is co-moulded a vulcanized rubber liner having a plurality of sealing lips.

In particular, a first, axially outer, sealing lip 52 and a second, axially inner, sealing lip 53 provide a seal against the rotating shaft 5. A sealing device 50 is interference fitted on a casing 3 and forms a sliding contact with a shaft 5 by means of a first sealing lip 52 and a second sealing lip 53.

Additionally, a vulcanized rubber liner comprises a further third sealing lip 54, which is not in contact with the shaft 5, but is in sliding contact with the radially inner ring 34. A third sealing lip 54 has the function of sealing the inner part of the support assembly 1. In fact, its position is such that, as the water pressure rises during testing, or in any operating conditions, the thrust received by this third sealing lip 54 against the radially inner ring 34 increases, and the sealing performance of this further lip therefore improves.

Additionally, within the vulcanized rubber liner, in the area where the sealing lips are present, the metal shield 51 is shaped and is provided with a substantially cylindrical radially inner portion 51a, which is not present in the prior art shields. This cylindrical portion 51a has the function of stiffening the rear sealing device 50 in the area where the sealing lips are provided.

The rear sealing device according to the present invention has three main characteristics.

A first characteristic, as indicated above, is due to the fact that the position and geometry of the further third sealing lip 54 are such that, as the water pressure increases, the thrust received by the third lip against the radially inner ring 34 also increases; in other words, the greater the interference created between the third sealing lip 54 and the radially inner ring 34, the better will be the sealing performance of this third sealing lip.

A second characteristic is due to the fact that the metal shield 51 is shaped and is provided with a substantially cylindrical radially inner portion 51a. This means that the second sealing lip 53, which bends during the process of mounting the shaft 5, is more rigid, since the metal shield 51, which imparts rigidity to the rear sealing device 50, has this substantially cylindrical portion 51a nearer to the second sealing lip 53.

The introduction of the third sealing lip 54 must be carried out in such a way as to avoid an excessive penalty in terms of the friction torque of the whole rear sealing device 50. Thus, when there is a further lip that increases the friction loss of the whole rear sealing device 50, the interference of the second sealing lip 53 must be reduced, in order to limit the friction losses while also reducing the bending deformation during the mounting of the shaft 5, as described above.

However, a third sealing lip 54 is assisted by the water pressure, and therefore does not require a high degree of interference with a radially inner ring 34. The value of this interference $i_{54}$ may be substantially equal to half the value of interference $i_{53}$ between a second sealing lip 53 and a shaft 5. In other words, the following must be true:

$$i_{54} \approx i_{53}/2$$

In particular, a second sealing lip, which has a nominal interference value of 0.9 mm with a tolerance of +0, −0.1 mm, may be modified to have a nominal interference value $i_{53}$ of 0.7 mm, or in any case in the range from 0.6 mm to 0.7 mm.

As mentioned, a third sealing lip 54 may have a lower interference value while still being capable of sealing the whole interior of the support assembly 1. Indeed, a nominal interference value $i_{54}$ may be equal to 0.45 mm, or in any case within the range from 0.35 mm to 0.45 mm.

Figure 3:
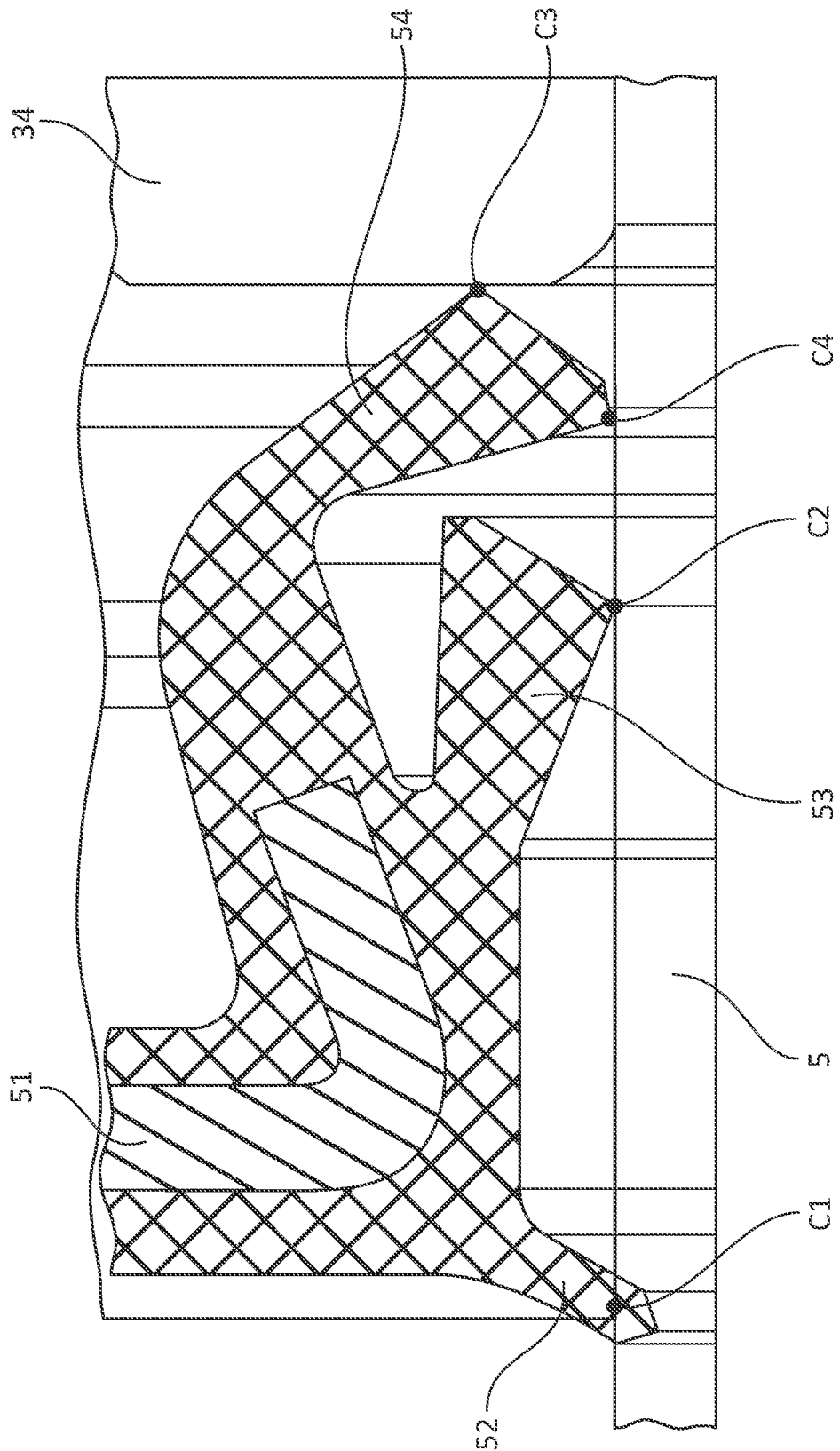
FIG. 3 shows schematically the sliding contact points between the lips of the rear sealing device and the rotating components of the support assembly.

A third characteristic of the invention consists in the fact that, after the mounting of a rear sealing device 50, a third sealing lip 54 bends as a result of the interference with a radially inner ring 34. Additionally, during the mounting of the shaft 5, the second sealing lip 53 is lifted and therefore bent. This means that, on completion of the mounting, the second and third sealing lips approach each other, and the distance between the second and third sealing lips becomes very small, thereby reducing the possibility of the entry of water into the interior of the support assembly 1. Moreover, the bending of the third sealing lip 54 also creates a small additional labyrinth with the shaft 5, which prevents water from entering the interior of the support assembly 1. This small labyrinth may possibly cease to exist and become a point of sliding contact C4 with the shaft. Thus the rear sealing device 50 provides up to four sliding contact points, as may be seen in FIG. 3, namely a first sliding contact point C1 between the first sealing lip 52 and the shaft 5, a second sliding contact point C2 between the second sealing lip 53 and the shaft 5, a third sliding contact point C3 between the third sealing lip 54 and the radially inner ring 34, and a possible fourth sliding contact point C4 between the third sealing lip 54 and the shaft 5. In this configuration, the barrier created by the rear sealing device 50 against water is even more effective.

Finally, this novel solution offers considerable advantages, among which the following may be mentioned:
- better performance of the rear sealing device
- higher resistance to contaminants
- the obtaining of IPx9k certification for the support assembly
- an improvement in the sealing performance of the whole support assembly.

In order to substantially resolve the aforementioned technical problems, one object of the present disclosure is to define a novel support assembly for food applications, particularly a support assembly for a rotating shaft and a corresponding bearing unit fixed to a machine frame.

For this purpose, according to one aspect, in order to improve the fluid sealing performance of the support assembly on its inner side, that is to say on the opposite side to the cover, the aim is to improve the performance of the rear sealing device. The rear sealing device is therefore provided with a further third sealing lip which, unlike the existing sealing lips, forms a sliding contact with the radially inner ring, and not with the shaft as the other two lips do. The further third sealing lip is designed to seal the inner part of the support assembly, being shaped so that, as the water pressure rises during testing, or in any operating conditions, the thrust received by this third sealing lip against the radially inner ring increases, and the sealing effect of this further lip therefore becomes greater.

Thus, according to the present invention, a support assembly for food applications is provided, with the characteristics stated in the independent claim appended to the present description.

Further preferred and/or particularly advantageous embodiments of the invention are described according to the characteristics stated in the appended dependent claims.

In various embodiments, a support assembly (1) for movable, rotating or sliding shafts (5), includes a bearing unit (30) adapted to receive the movable shaft, a casing (3) and a cover (10) for fluid sealing an opening (11) of an internal seat (4) of the casing (3). A bearing unit (30) includes a radially outer ring (31), a radially inner ring (34) and a row of rolling bodies (32) between the radially outer ring (31) and the radially inner ring (34). A support assembly (1) also has a rear sealing device (50), placed on the opposite side with respect to the cover (10), and comprising a metal screen (51) and a vulcanized rubber liner equipped with a first sealing lip (52) axially outer and with a second sealing lip (53), axially inner. A rear sealing device (50) includes a further third sealing lip (54) slidably (or slidingly) contacting the radially inner ring (34).

In various embodiments of a support assembly the metal shield (51) of the rear sealing device (50) is shaped and is provided with a shaped portion (51a) radially internal relative to the bearing unit. In some embodiments, shaped portion 51a is substantially cylindrical in shape. In other embodiments, shaped portion 51a defines a substantially frustoconical shape.

In various embodiments of a support assembly there is a labyrinth seal between the third sealing lip (54) and the shaft (5). For example, a labyrinth seal formed at least in part by a second sealing lip 53 and a first sealing lip 52.

In various embodiments of a support assembly there is a sliding contact (C4) between the third sealing lip (54) and the shaft (5).

In various embodiments of a support assembly the rear sealing device (50) realizes four sliding contact points: a first sliding contact point (C1) between the first sealing lip (52) and the shaft (5), a second sliding contact point (C2) between the second sealing lip (53) and the shaft (5), a third sliding contact point (C3) between the third sealing lip (54) and the radially inner ring (34) and a fourth sliding contact point (C4) between the third sealing lip (54) and the shaft (5).

In various embodiments of a support assembly the value of the interference ($i_{54}$) between the third sealing lip (54) and the radially inner ring (34) is substantially equal to half the value of interference ($i_{53}$) between the second sealing lip (53) and the shaft (5).

In various embodiments of a support assembly the interference value ($i_{53}$) between the second sealing lip (53) and the shaft (5) is comprised in a range between 0.6 mm and 0.7 mm.

In various embodiments of a support assembly the interference value ($i_{54}$) between the third sealing lip (54) and the radially inner ring (34) is comprised in a range between 0.35 mm and 0.45 mm.

In addition to the embodiment of the invention as described above, it is to be understood that there are numerous other variants. It is also to be understood that these embodiments are described solely by way of example and do not limit the object of the invention or its applications or its possible configurations. On the contrary, although the description given above enables a person skilled in the art to implement the present invention according to at least one example of its embodiment, it is to be understood that numerous variations of the components described are possible without departure from the object of the invention as defined in the appended claims, which are interpreted literally and/or according to their legal equivalents.

We claim:

1. A support assembly for a movable shaft comprising:
   a casing;
   a cover for fluid sealing an opening of an internal seat of the casing;

a bearing unit adapted to receive a movable shaft, the bearing unit including:
  a radially outer ring;
  a radially inner ring; and
  a row of rolling bodies between the radially outer ring and the radially inner ring; and
a rear sealing device, disposed on an opposite side of the bearing unit with respect to the cover, formed of a metal screen having a vulcanized rubber liner defining:
a first axially outer sealing lip;
a second axially inner sealing lip; and
a third sealing lip radially outer relative to the second axially inner sealing lip in sliding contact with the radially inner ring.

2. The support assembly of claim 1, wherein the metal shield of the rear sealing device is shaped and is provided with a substantially cylindrical portion extending from a radially internal end of the metal screen.

3. The support assembly of claim 1, wherein the third sealing lip forms a labyrinth seal with a shaft in an assembled configuration.

4. The support assembly of claim 1, wherein the third sealing lip is in slidable contact with the shaft.

5. The support assembly of claim 4, wherein the rear sealing device realizes four sliding contact points: a first sliding contact point between the first sealing lip and the shaft, a second sliding contact point between the second sealing lip and the shaft, a third sliding contact point between the third sealing lip and the radially inner ring and a fourth sliding contact point between the third sealing lip and the shaft.

6. The support assembly of claim 1, in which the value of the interference between the third sealing lip and the radially inner ring is substantially equal to half the value of interference between the second sealing lip and the shaft.

7. The support assembly of claim 6, wherein the interference value between the second sealing lip and the shaft is comprised in a range between 0.6 mm and 0.7 mm.

8. The support assembly of claim 6, wherein the interference value between the third sealing lip and the radially inner ring is comprised in a range between 0.35 mm and 0.45 mm.

9. A sealing device for sealing a bearing unit on a side of the bearing unit opposite a cover, the sealing device comprising:
  a metal screen having a vulcanized rubber liner defining:
    a radially outer cylindrical member extending from a radially extending annular member;
    and a shaped portion extending from a radially internal end of the radially extending annular member; and
  a first axially outer sealing lip extending radially inwardly and axially inwardly from the radially internal end of the metal screen;
  a second axially inner sealing lip extending radially inwardly and axially outwardly from the shaped portion; and
  a third sealing lip radially outer relative to the second axially inner sealing lip and extending axially inwardly from the shaped portion, wherein the third sealing lip forms a labyrinth seal with a shaft in an assembled configuration.

10. The sealing device of claim 9, wherein the shaped portion is frustoconical in shape.

11. A sealing device for sealing a bearing unit on a side of the bearing unit opposite a cover, the sealing device comprising:
  a metal screen having a vulcanized rubber liner defining:
    a radially outer cylindrical member extending from a radially extending annular member;
    and a shaped portion extending from a radially internal end of the radially extending annular member; and
  a first axially outer sealing lip extending radially inwardly and axially inwardly from the radially internal end of the metal screen;
  a second axially inner sealing lip extending radially inwardly and axially outwardly from the shaped portion; and
  a third sealing lip radially outer relative to the second axially inner sealing lip and extending axially inwardly from the shaped portion, wherein the third sealing lip is in slidable contact with a shaft in an assembled configuration.

12. The sealing device of claim 11, wherein the sealing device in an assembled condition realizes four sliding contact points: a first sliding contact point between first axially outer sealing lip the shaft, a second sliding contact point between the second axially inner sealing lip and the shaft, a third sliding contact point between the third sealing lip and a radially inner ring and a fourth sliding contact point between the third sealing lip and the shaft.

13. A sealing device for sealing a bearing unit on a side of the bearing unit opposite a cover, the sealing device comprising:
  a metal screen having a vulcanized rubber liner defining:
    a radially outer cylindrical member extending from a radially extending annular member;
    and a shaped portion extending from a radially internal end of the radially extending annular member; and
  a first axially outer sealing lip extending radially inwardly and axially inwardly from the radially internal end of the metal screen;
  a second axially inner sealing lip extending radially inwardly and axially outwardly from the shaped portion; and
  a third sealing lip radially outer relative to the second axially inner sealing lip and extending axially inwardly from the shaped portion,
  in which a value of an interference, when in an assembled state, between the third sealing lip and a radially inner ring is substantially equal to half a value of interference between the second sealing lip and the shaft.

14. The sealing device of claim 13, wherein the interference value between the second sealing lip and the shaft is in a range between 0.6 mm and 0.7 mm.

15. The sealing device of claim 14, wherein the interference value between the third sealing lip and the radially inner ring is comprised in a range between 0.35 mm and 0.45 mm.

* * * * *